US012555492B2

(12) United States Patent
Ghosh et al.

(10) Patent No.: US 12,555,492 B2
(45) Date of Patent: Feb. 17, 2026

(54) DIGITAL MICROFLUDICS-BASED BRAILLE ACTUATION IN A STRETCHABLE DISPLAY

(71) Applicant: INTERNATIONAL BUSINESS MACHINES CORPORATION, Armonk, NY (US)

(72) Inventors: Partho Ghosh, Kolkata (IN); Balakrishna Ganguneni, Visakhapatnam (IN); Aaron Kaminski, Auburn, MA (US); Venkataramana Bora, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 17/303,897

(22) Filed: Jun. 10, 2021

(65) Prior Publication Data

US 2022/0398941 A1    Dec. 15, 2022

(51) Int. Cl.
  *G09B 21/00* (2006.01)
  *G06F 3/041* (2006.01)
  *G09F 9/30* (2006.01)
  *G09F 9/33* (2006.01)

(52) U.S. Cl.
  CPC ......... *G09B 21/008* (2013.01); *G06F 3/0412* (2013.01); *G09B 21/004* (2013.01); *G09B 21/005* (2013.01); *G09F 9/301* (2013.01); *G09F 9/33* (2013.01)

(58) Field of Classification Search
  CPC .. G09B 21/008; G09B 21/004; G09B 21/005; G09B 21/02; G06F 3/0412; G09F 9/301; G09F 9/33
  See application file for complete search history.

(56) References Cited

U.S. PATENT DOCUMENTS

| 8,313,941 | B2 | 11/2012 | Takayama |
| 9,391,286 | B1 | 7/2016 | Kwon |
| 9,965,974 | B2 | 5/2018 | Labbé et al. |
| 10,725,647 | B2 | 7/2020 | Klein |

(Continued)

FOREIGN PATENT DOCUMENTS

| CN | 2410688 Y | 12/2000 |
| CN | 103098113 A | 5/2013 |

(Continued)

OTHER PUBLICATIONS

International Search Report and Written Opinion of International Application No. PCT/CN2022/097582, IBM Docket No. P202006850PCT01, mailed Aug. 25, 2022, 10 pages.
Ghosh et al., "Digital Microfludics-Based Braille Actuation in a Stretchable Display", International Application No. PCT/CN2022/097582, Filed: Jun. 8, 2022, 36 pages.

(Continued)

*Primary Examiner* — Kang Hu
*Assistant Examiner* — Anthony James Bulthuis
(74) *Attorney, Agent, or Firm* — Michael O'Keefe

(57) ABSTRACT

According to one embodiment, a method, computer system, and computer program product for dynamic braille actuation is provided. The embodiment may include receiving a plurality of media. The embodiment may also include translating one or more visual elements of the received plurality of media to braille. The embodiment may further include generating a plurality of protrusions corresponding to the one or more translated visual elements on a surface of a stretchable display screen using microfluidic actuation.

20 Claims, 7 Drawing Sheets

(56) References Cited

U.S. PATENT DOCUMENTS

| | | | |
|---|---|---|---|
| 2002/0106614 A1 | 8/2002 | Prince | |
| 2007/0243627 A1 | 10/2007 | Takayama | |
| 2013/0044100 A1 | 2/2013 | King | |
| 2015/0363365 A1* | 12/2015 | Campbell | G06F 3/016 |
| | | | 345/173 |
| 2017/0068318 A1 | 3/2017 | Mcclure | |
| 2018/0342176 A1* | 11/2018 | Californiaa | G09B 21/04 |

FOREIGN PATENT DOCUMENTS

| | | | |
|---|---|---|---|
| CN | 103268720 A | | 8/2013 |
| CN | 107093353 A | | 8/2017 |
| CN | 108806411 A | | 11/2018 |
| CN | 212135741 U | | 12/2020 |
| IN | 201501205-12 | * | 12/2015 |
| KR | 101945721 B1 | | 2/2019 |
| WO | 2022/257956 A1 | | 12/2022 |

OTHER PUBLICATIONS

Johnston, "Microfluidics panel could add physical buttons to a touch screen," ars Technica, Jan. 23, 2014, Retrieved from the Internet: https://arstechnica.com/gadgets/2014/01/new-microfluidics-panel-could-add-physical-buttons-to-a-touch-screen/, 5 pages.

Kato et al., A Flexible, Lightweight Braille Sheet Display with Plastic Actuators Driven by An Organic Field-Effect Transistor Active Matrix, IEEE International Electron Devices Meeting, 2005. IEDM Technical Digest, doi: 10.1109/IEDM.2005.1609277, 5 pages.

Mell et al., "The NIST Definition of Cloud Computing", National Institute of Standards and Technology, Special Publication 800-145, Sep. 2011, 7 pages.

Sean, "Stretchable screens will soon be a reality as LG Display plans on developing the technology by 2024," Gizmochina, Jun. 11, 2020, Retrieved from the Internet: https://www.gizmochina.com/2020/06/11/stretchable-display-may-soon-be-a-reality-as-lg-display-plans-on-developing-the-technology-by-2024/, 3 pages.

* cited by examiner

DIGITAL MICROFLUDICS-BASED BRAILLE ACTUATION IN A STRETCHABLE DISPLAY

BACKGROUND

The present invention relates generally to the field of computing, and more particularly to braille displays.

Braille is a system of writing used by individuals with visual impairments that might not otherwise be able to easily view handwritten characters. The traditional braille system utilizes individual cells of six raised dots where three raised dots are represented in two parallel columns. From the 64 possible combinations available in the six-dot format, alphabetic letters, numbers, punctuation, and even complete words can be represented. Recently, the braille system has expanded to an eight-dot system, or the Unicode block Braille Patterns, which allow for 256 possible dot combinations. The combinations in eight-dot braille may be represented as symbols without connection to an alphabetic letter or number, which allows the same symbol to be used in multiple language scripts.

Braille can be used to write many languages, including English, Spanish, Arabic, and Chinese languages. Written braille can be represented as contracted or uncontracted. Uncontracted braille relates to the spelling out of each word with individual lettered characters whereas contracted braille relates to using shortened word forms sometimes represented by a single letter. For example, the uncontracted form of the work "like" may juxtapose each braille character for "l", "i", "k", and "e" whereas the contracted form of like may be represented as the braille character for "l" and utilize the surrounding contracted words to allow a reader to understand the word through the context in which it is used. The braille writing system traditionally involves creating tactile impressions on paper using a slate and stylus or a braille writer. Additionally, braille typewriters and printers allow for faster creation of braille embossments.

SUMMARY

According to one embodiment, a method, computer system, and computer program product for dynamic braille actuation is provided. The embodiment may include receiving a plurality of media. The embodiment may also include translating one or more visual elements of the received plurality of media to braille. The embodiment may further include generating a plurality of protrusions corresponding to the one or more translated visual elements on a surface of a stretchable display screen using microfluidic actuation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
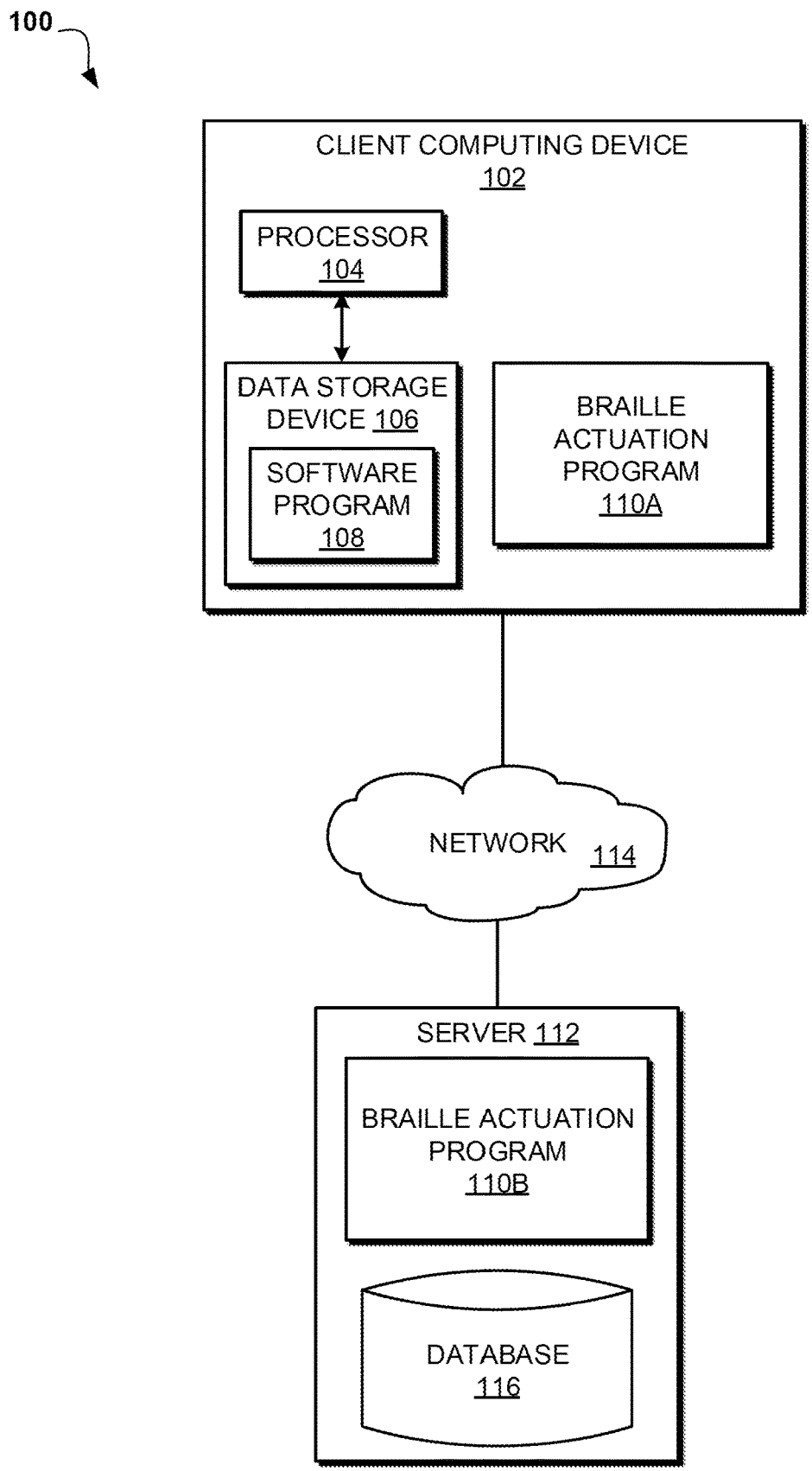
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to braille displays. The following described exemplary embodiments provide a system, method, and program product to, among other things, enable braille protrusion capabilities on modern stretchable, touchscreen displays as both an input and output medium. Therefore, the present embodiment has the capacity to improve the technical field of braille displays by providing a reusable and configurable digital braille system that is compact, less costly, and long lasting with minimal wear and tear on the user device. Furthermore, Web Content Accessibility Guidelines (WCAG) are part of a series of web accessibility guidelines published by the W3C's Web Accessibility Initiative and consist of a set of guidelines on making content accessible, primarily for impaired users, but also for devices, such as highly limited device (e.g., smartphones). A reusable and configurable braille system as presented herein may enable generation of an accessible alternative output in the form of synthetic speech from an initial content displayed on stretchable-protruding braille display in accordance with web accessibility guidelines such as WCAG 1.0, WCAG 2.0, and future editions.

As previously described, braille is a system of writing used by individuals with visual impairments that might not otherwise be able to easily view handwritten characters. The traditional braille system utilizes individual cells of six raised dots where three raised dots are represented in two parallel columns. From the 64 possible combinations available in the six-dot format, alphabetic letters, numbers, punctuation, and even complete words can be represented. Recently, the braille system has expanded to an eight-dot system, or the Unicode block Braille Patterns, which allow for 256 possible dot combinations. The combinations in eight-dot braille may be represented as symbols without connection to an alphabetic letter or number, which allows the same symbol to be used in multiple language scripts.

Braille can be used to write many languages, including English, Spanish, Arabic, and Chinese languages. Written braille can be represented as contracted or uncontracted. Uncontracted braille relates to the spelling out of each word with individual lettered characters whereas contracted braille relates to using shortened word forms sometimes represented by a single letter. For example, the uncontracted form of the work "like" may juxtapose each braille character for "l", "i", "k", and "e" whereas the contracted form of like may be represented as the braille character for "l" and utilize the surrounding contracted words to allow a reader to understand the word through the context in which it is used. The braille writing system traditionally involves creating tactile impressions on paper using a slate and stylus or a braille writer. Additionally, braille typewriters and printers allow for faster creation of braille embossments.

Electronic forms of braille readers use mechanical pins that are raised or lowered based on the character to be projected on a surface area. Recently, braille e-books have been developed with refreshable braille displays that use electronic polymers or heated wax rather than the mechanical pins of earlier devices. However, these devices have mainly been accessories to other user computing devices, such as laptops, smartphones, and tablets. Furthermore, cost, usability, adoption and updating, responsive integration, and inefficiencies of existing technologies are the greatest hurdles when enabling devices with braille capabilities.

For users of braille, specialty devices are needed with steep adoption costs. For example, a braille user of technology would need to purchase a braille keyboard along with necessary software to allow for seamless integration with existing devices, such as a smartphone and its accompanying virtual assistant technology, as well as a braille reader or braille e-book should vocal playback using text-to-speech technology not be available or inopportune for the user, such as when using a device in a no noise environment.

Additionally, the affect on usability can be seen in the display of braille characters and digital elements in braille readers as well as the integration of braille keyboard with modern operating systems. Currently, as many braille readers display a single line of text which may make reading longer texts, such as books or articles, difficult as a user interaction, typically a button press, is required to change the presented text to the next line. Currently, braille readers may be incapable of dynamic digital mark-up of content items, such as images. Further, braille keyboards with Android operating system integration have adopted a 5+5 button approach which includes a combination of buttons for different letters distinguishable from a QWERTY keyboard which has a button designated for each alphabetic character. The 5+5 button approach is lacking in the feel of touch when using the keyboard and button location identification.

Furthermore, despite many braille devices, such as braille-enabled smartphones, tablets or touch keyboards, coming to market, adoption of braille technologies has lacked support in many newer devices, such as smartphones, e-readers, and smart TV remotes/interfaces.

Converts are devices that aim to translate written word to braille. However, converters do not reveal perfectly accurate information which can be felt with touch, such as images, graphs, and charts. Additionally, converters, like some braille readers discussed earlier, process and/or read written language line-by-line, which can result in slowing a proficient braille user's interaction. Furthermore, many braille devices lack the programs and software that are becoming conventional in new technological devices, such as smartphone with a flexible display.

Additionally, existing technologies appear inefficient when using braille under certain circumstances, such as a user losing feel of touch when trying to read braille while wearing gloves.

Another technology, conventional active microfluidics, appears to fill a needed gap in braille technologies, however, this technology also has drawbacks. Active microfluidics refers to the defined manipulation of the working fluid or gas by active micro-components, such as micro-pumps and micro-valves. In a braille display, these micro-components pneumatically raise or lower dots on a display surface. Although active microfluidics allows multiple lines of braille to be projected on a display surface and lowers the traditional cost of generating braille on electronic devices, it fails to solve problems presented with some modern technologies. For example, a 14.1" screen tablet with XGA resolution (1024×768 pixels) has a total of 2,359,296 red, green, and blue pixels or dots. This figure may increase with OLED, QLED, or resolution and size of an image. With the number of pixels possible, the number of pneumatic micro-components needed to accurately replicate text may become significantly large. Additionally, controlling and maintaining large numbers of pneumatic values and pumps may become problematic due to potential failures and wear-and-tear which may render the active microfluidic device inoperable. As such, it may be advantageous to, among other things, utilize a stretchable, expandable, and/or foldable flexible display to be braille-enabled as both an input and output medium in a single user device so as to resolve current inefficiencies and drawbacks of traditional braille devices.

According to at least one embodiment, a user device may be enabled with tactile pixel protrusions of an elastic or stretchable display by using an under display digital microfluidics panel where micro-ports may be protruded, partially protruded, retracted, or partially retracted using insulated electrodes and/or LEDs, such as QLED, OLED, LED, etc., capable of being actuated programmatically. Tactile braille dots may be enabled in an elastic or stretchable display device where the display interface parameters may be used to programmatically actuate one or more microfluidic protruding and/or retracted ports to leverage, convert, and replicate the mark-up components into protruding tactile elements for input, output, tactility, and accessibility interactions. Additionally, linguistic specific grade 1, grade 2, and grade 3 character codes and their corresponding short hand notations may be dynamically converted and translated from text to braille dots in the stretchable display as letters, spacing, punctuation, and special signs to enable short hand braille contractions as input, output, actionable, and non-actionable content in display. Furthermore, inversion of specialty braille codes using a combination of six-dot braille protrusions to represent corresponding braille notations, such as musical notations, mathematical equations or expressions, graphical elements, scientific diagrams and notations, computer syntaxes, gaming graphic notations, chemical equations, circuit diagrams, and molecular formulas, may also be enabled.

Additionally, dynamic pressure and touch inputs may be understood along with different patterns, durations, and/or intensities disclosed for localized sensory stimulus by users to enable device software-related events, such as copy, select, and highlight. The microfluidics stretchable display may enable pressure detection and touch gestures, such as press-drag, deep press, long touch, double touch, and finger movement from a first location on a braille character or symbol to a second location on a braille character or symbol, which may be interpreted as a command.

Furthermore, AI-based intelligent linguistic assistive accessibility and/or screen reader features, such as braille text; mathematics; scientific notations; musical notations; and descriptions along with tactile graphics, images or parts of images, and dynamic events (e.g., gaming events or maps) that can be actuated by multifarious pressure touch input pattern, durations, and/or intensities, may be enabled. The intelligent accessibility or screen reader can also dynamically convert one and/or a group of musical sequence pressure-drag-based dynamic musical notations to be played as user preferential instrumental music (e.g., keyboard or synthesizer). Dynamic elements of tactile graphics, such as colors along with context of the graphical content, may be read using AI to analyze the graphical content between the initial touch location and the end location of the dynamic elements to provide contextual information for the tactile graphics.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to dynamically adjust heights of protrusions on a stretchable display using digital microfluidics to create tactile dots that can support braille characters, codes, and symbols.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 and server 112 may each individually host a braille actuation program 110A, 110B. In one or more other embodiments, the braille actuation program 110A, 110B may be partially hosted on both client computing device 102 and server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a braille actuation program 110A and communicate with the server 112 via the communication network 114, in accordance with one embodiment of the invention. In one or more embodiments, client computing device 102 may be, for example, a mobile device, a telephone, a personal digital assistant, a netbook, a laptop computer, a tablet computer, a desktop computer, or any type of computing device capable of running a program and accessing a network. In at least one embodiment, client computing device 102 may have an elastic or stretchable display screen that allows digital microfluidic actuators to generate pixel protrusions on the surface of the display screen. In at least one embodiment, the stretchable display may include displays that are foldable, rollable, or otherwise allow for flexibility outside of a rigid, flat surface. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a braille actuation program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the braille actuation program 110A, 110B may be capable of receiving, as input, a text or images displayed on a display screen of the client computing device 102 and translating the received text into a linguistic specific grade of braille characters codes, symbols, images, etc. and, using digital microfluidic actuation capabilities of the client computing device 102, generate protrusions on the display surface of the client computing device 102 that correspond to the braille-translated text and images. The braille actuation arrangement method is explained in further detail below with respect to FIG. 2.

Figure 2:
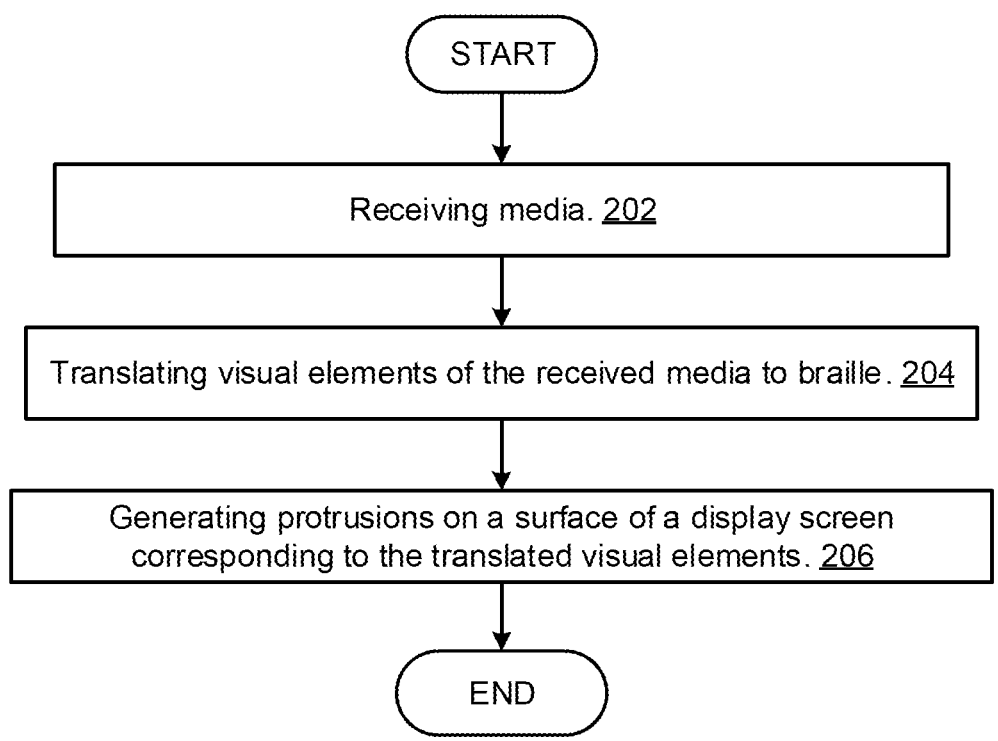
FIG. 2 illustrates an operational flowchart for a braille actuation process according to at least one embodiment.

Referring now to FIG. 2, an operational flowchart illustrating a braille actuation process 200 is depicted according to at least one embodiment. At 202, the braille actuation program 110A, 110B receives media. The media received by the braille actuation program 110A, 110B may include text, images, videos, audio, or any other media capable of being presented to a user through a user device, such as client computing device 102. The braille actuation program 110A, 110B may receive media prior to or contemporaneous to presenting the media on a display screen. For example, the braille actuation program 110A, 110B may receive a text before the text is visually displayed on the display screen or the braille actuation program 110A, 110B may receive the text when the text is being displayed on the display screen.

Then, at 204, the braille actuation program 110A, 110B translates visual elements of the received media to braille. Once media has been received, the braille actuation program 110A, 110B may determine a type within which each element of received media may be classified, such as text, visual, or audio. For each element of text, the braille actuation program 110A, 110B may dynamically convert and translate the text to linguistic-specific grade 1, grade 2, or grade 3 braille character codes and corresponding short hand notations. Similarly, each visual element, such as images, may be converted to three dimensional representation that may be depicted on the display surface of a user device using dynamic microfluidic actuation.

With respect to representation of visual elements, the braille actuation program 110A, 110B may extend, retract, or depress one or more dots through dynamic microfluidic actuation to form a continuation three dimensional representation of the received visual element. In at least one embodiment, the dots used to form the three dimensional representation may be only partially extended or partially depressed to allow a more accurate depiction of the visual element than would be available should the dots only be capable of full extension or full depression. Similarly, the braille actuation program 110A, 110B may recreate dynamic content, such as maps, where navigation, turns, streets, and landmarks (e.g., hospitals, gas stations, bus stops, etc.) may be enabled using digital microfluidics braille.

In at least one embodiment, the braille actuation program 110A, 110B may translate textual elements to represent characters in various alphabets and languages, numbers, punctuation marks, nationality specific characters (e.g., umlauts, accent marks, or currency designations), fonts, and settings icons (e.g., magnification, volume settings, brightness, etc.).

In at least one other embodiment, the braille actuation program 110A, 110B may be capable of translating musical codes and other musical aspects, such as pitch and rhythm notations, musical notes, octave, and harmonic indications, to braille or sensory representations using digital microfluidics. The braille actuation program 110A, 110B may also enable repeating musical braille signs, such as beat, part-bar or whole bar, conventions for repeating previous bar(s), specific numbered bar(s), or sections using grade 3 musical protrusions, to conserve surface space.

In yet another embodiment, the braille actuation program 110A, 110B may be enabled to translate chemical notations, which may consist of combinatory notations of chemical elements, symbols, numbers, and other occasionally used symbols, such as parentheses, dashes, brackets, commas, hexagons, double lines, and positive and negative signs to enable structural formulas, molecular formulas, chemical equations, reaction derivations, etc. The braille actuation program 110A, 110B may also enable translation of braille chemical notations, such as chemical elements, structural notations, chemical equations, etc.

In another embodiment, the braille actuation program 110A, 110B may be enabled to translation other specialty braille codes, such as mathematical equations or expressions, scientific equations, and computer syntaxes into corresponding braille notations. Additionally, the braille actuation program 110A, 110B may be capable of translating the successful inversion of mathematical formulas into braille-like conventions.

In still another embodiment, the braille actuation program 110A, 110B may be enabled to translate braille graphic translation, which may dynamically alter the graphic elements, such as graphs or spreadsheets, into corresponding braille protruding notations along with reversion to tactile graphics for unsupported braille elements, such as biological diagrams (e.g., neurons), electrical circuitry diagrams (e.g., circuit breakers, resistors, impedance), and other spatially distributed graphical content.

In another embodiment, the braille actuation program 110A, 110B may be enabled to translate digital gaming elements, such as symbols, suits, values, and images in some games, such as playing card, tic-tac-toe, chess, and ludo. The digital gaming elements may be translated in combination with dynamic in-game events, such as dice rolls, a winning move, or a blocking move, when coupled with intelligent assistive accessibility. The braille actuation program 110A, 110B may be capable of translating a combination of static and dynamic elements of digital single/multiplayer games, such as board games, chess, checkers, and card games. For example, if a digital board game has named spaces and a player has the opportunity to purchase a space during game play, the braille actuation program 110A, 110B may dynamically translate the standard text to indicate that a player is the in-game owner of the specific space.

Next, at 206, the braille actuation program 110A, 110B generates protrusions on the surface of a display screen corresponding to the translated visual elements. Under the stretchable display of the user device, one or more digital microfluidics panels may be embedded and controllable by the braille actuation program 110A, 110B. The digital microfluidics panel may have multiple micro ports and micro electrode and liquid actuator mechanisms. The braille actuation program 110A, 110B may programmatically generate the protrusions corresponding to the translated elements through dynamic microfluidic actuators embedded beneath the stretchable or elastic display screen surface. Furthermore, based on need, the surface of the microfluidics panel may be raised to enable micro LED (e.g., LED, QLED, etc.) dots. During operation of the display system, the upper surface of the stretchable or elastic display may form a plurality of micro dots which are extended and retracted based on the operation of each of the microfluidic pixel dots.

Beneath each color LED pixel, a microfluidic droplet may be positioned between a pair of hydrophobic layers so as to keep the microfluidic droplet in place. Along one hydrophobic layer, a ground electrode may be affixed, which itself may be connected to a voltage source. Along another hydrophobic layer, an insulating layer may be affixed with one or more actuation electrodes embedded. Each actuation electrode may correspond to a different height by which the microfluidic droplet may be raised. Additionally, each actuation electrode may be connected to the voltage source. When generating protrusions on the display surface according to the translated elements, the braille actuation program 110A, 110B may close a circuit between actuation electrodes that correspond to a height at which each color LED pixel may be raised so as to create the desired protrusion on the stretchable display surface and recreate the translated elements.

Figure 3:
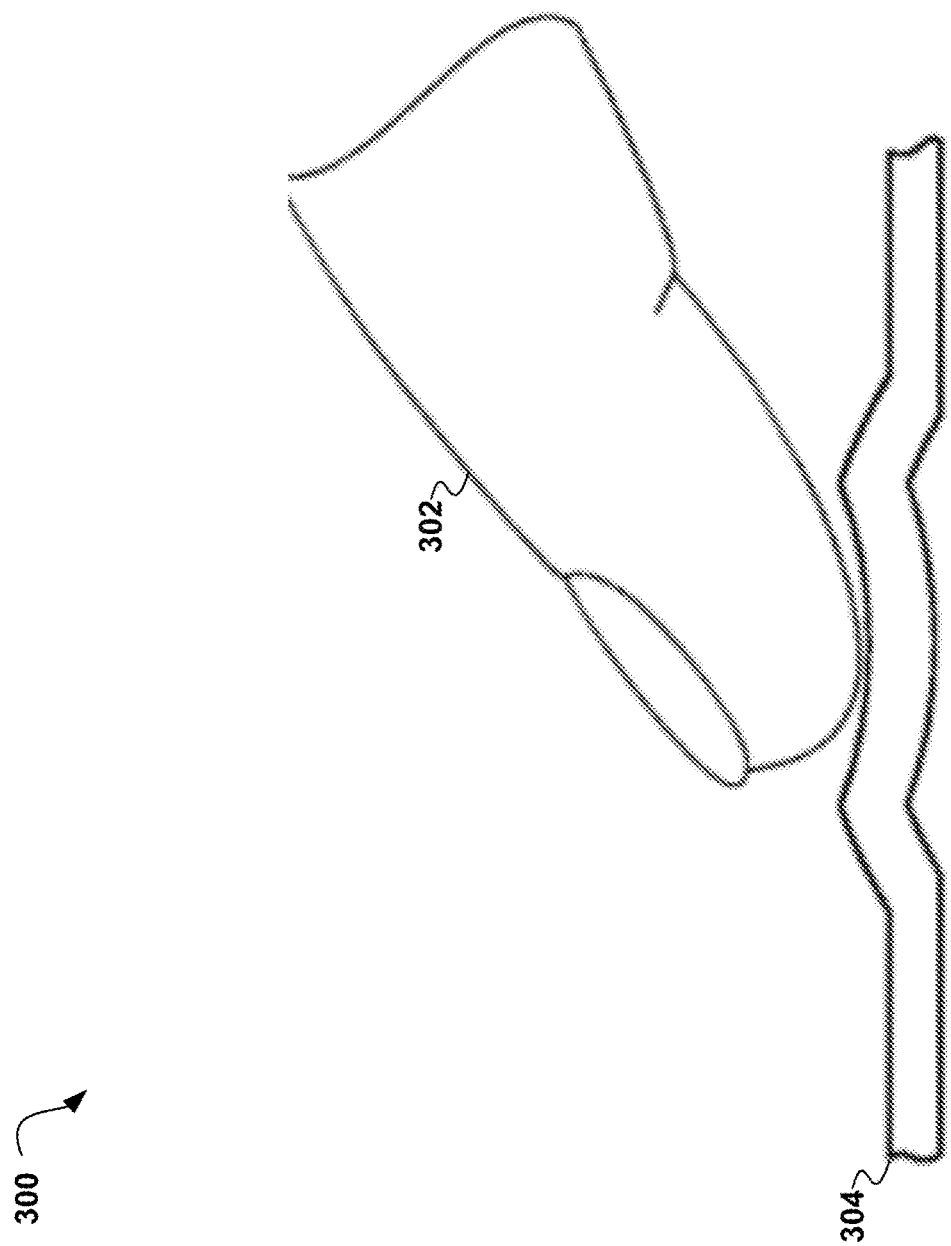
FIG. 3 depicts a functional block diagram of user interacting with protruding braille text according to at least one embodiment.

Referring now to FIG. 3, a functional block diagram of a user interacting with protruding braille text is depicted according to at least one embodiment. When displaying protrusions from the stretchable device screen 304, the braille actuation program 110A, 110B may allow a user 304 to interact with the stretchable device screen 304 in various preconfigured interactions normally associated with touchscreen technology, such as multiple presses, touch-drag, deep touch, or long touch techniques that may be associated with certain hot key-like functions. For example, the braille actuation program 110A, 110B may allow a user to interact with one or more braille symbol protrusions, such as a finger press that depresses or otherwise applies pressure, and interpret the interaction as the user desiring a certain result, such as navigating to a destination associated with URL-linked text depicted by the protruding braille symbol(s). The braille actuation program 110A, 110B may also be enabled to interpret certain touch actions on a image translated to braille and depicted on the display surface, such as enlarging an image or searching the Internet for information related to the image.

The braille actuation program 110A, 110B may enable controls, such as links, buttons, and other interaction controls, as well as structural elements, such as frames, graphics, headings, lists, and tables, using braille assistive touch technology where the assistive screen reader may dynamically read the control type, name, and/or other attributes when the protruding key item or text content is being touched by a user.

In at least one embodiment, the braille actuation program 110A, 110B may understand and distinguish actionable, non-actionable, and partially actionable elements and their relevant touch and/or three-dimensional touch events. A similar replication to the touch events may be imitated through vibration events similar, but not limited to, short, long, and multiple vibrations. In at least one other embodiment, the braille actuation program 110A, 110B may be capable of replicating text on a long press and moving the text to a different line, which other braille-enabled devices are incapable of performing due to functional limitations of only being able to display a single line of text at a time.

Figure 4:
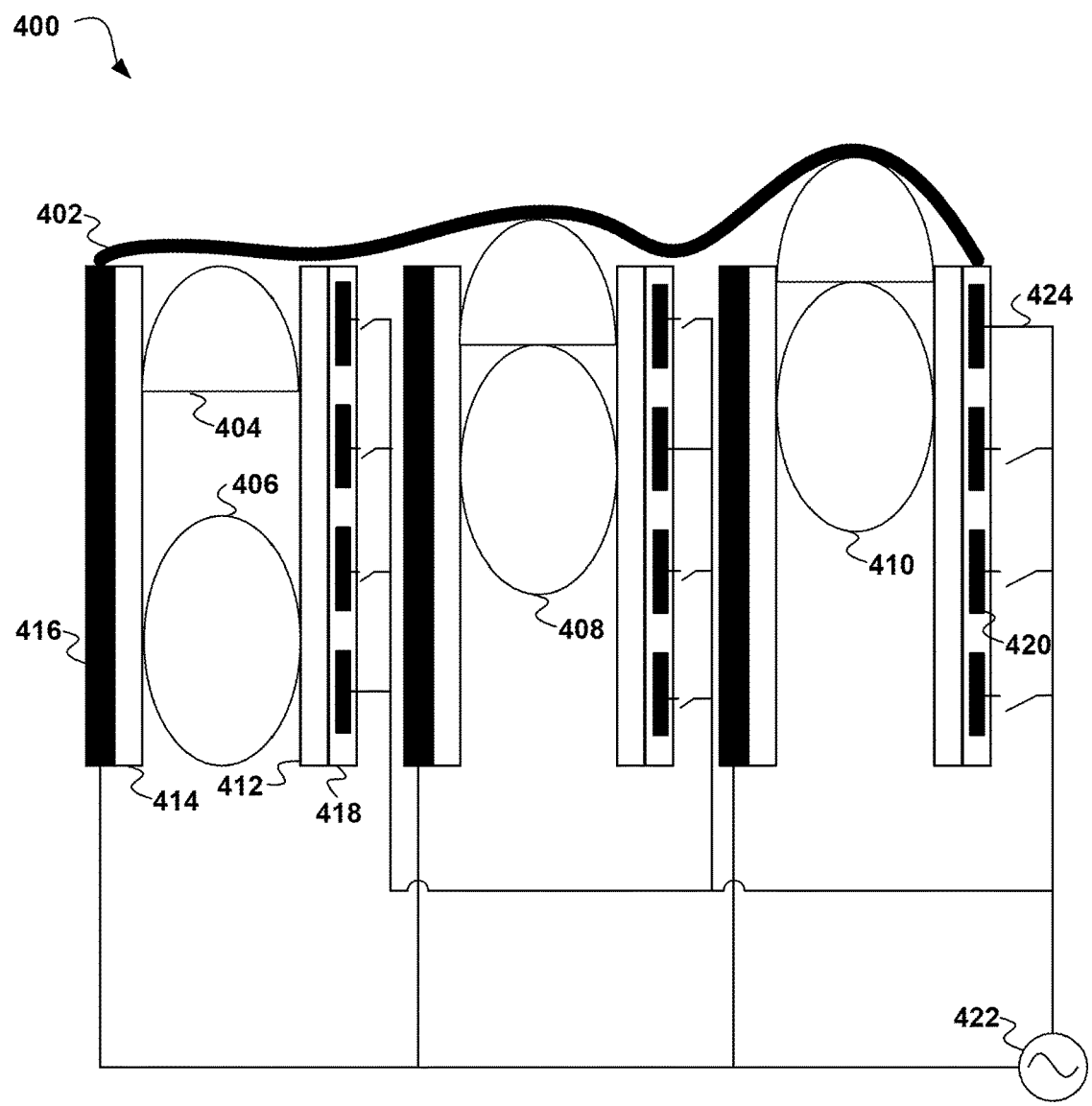
FIG. 4 depicts a functional block diagram of a user device cross section capable of braille actuation according to at least one embodiment.

Referring now to FIG. 4, a functional block diagram of a user device cross section capable of braille actuation is depicted according to at least one embodiment. As previously described in step 206, a microfluidic layer may be placed underneath an elastic or stretchable display screen 402. The microfluidic layer may include color LED pixels, such as color LED pixel 404, with a microfluidic droplet, such as microfluidic droplets 406-410. Each microfluidic droplet, such as microfluidic droplet 406, and color LED pixel, such as color LED pixel 404, may be aligned between hydrophobic layers 412 and 414. One hydrophobic layer 414 may have an affixed ground electrode 416 and the corresponding hydrophobic layer 412 may have an affixed insulating layer 418. Each insulating layer 418 within the microfluidic layer may have embedded actuation electrodes, such as actuation electrode 420, each connected to a voltage source 422 by a switch that may be closed (i.e., connected to the voltage source 422) or open (i.e., not connected to the voltage source 422). When a microfluidic droplet is fully depressed, such as microfluidic droplet 406, the lowest actuation electrode may be closed to the voltage source 422. This may result in the remaining actuation electrodes embedded within the same insulating layer to be open. Similarly, when a microfluidic droplet is fully raised, such as microfluidic droplet 410, (meaning a protrusion is fully extended on the stretchable display screen 402) the highest actuation electrode may be closed to the voltage source 422. When creating an image or other textured surface needing less than a full protrusion, a mid-level actuation electrode may be closed to the voltage source to allow a microfluidic droplet, such as microfluidic droplet 408, to partially rise and create a less pronounced protrusion on the stretchable display screen 402. In at least one embodiment, multiple actuation electrodes 424 may be closed to the voltage source 422 to allow various levels of rise of the microfluidic droplets and corresponding protrusion heights formed on the stretchable display screen.

As previously discussed, a user may interact with the stretchable display screen by applying varied pressures to the stretchable display screen 402. A pressure applied may depress each color LED pixel 404 and/or one or more microfluidic droplets 406-408. The depressions may be identified by the braille actuation program 110A, 110B and translated to various preprogrammed user commands within the client computing device 102.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
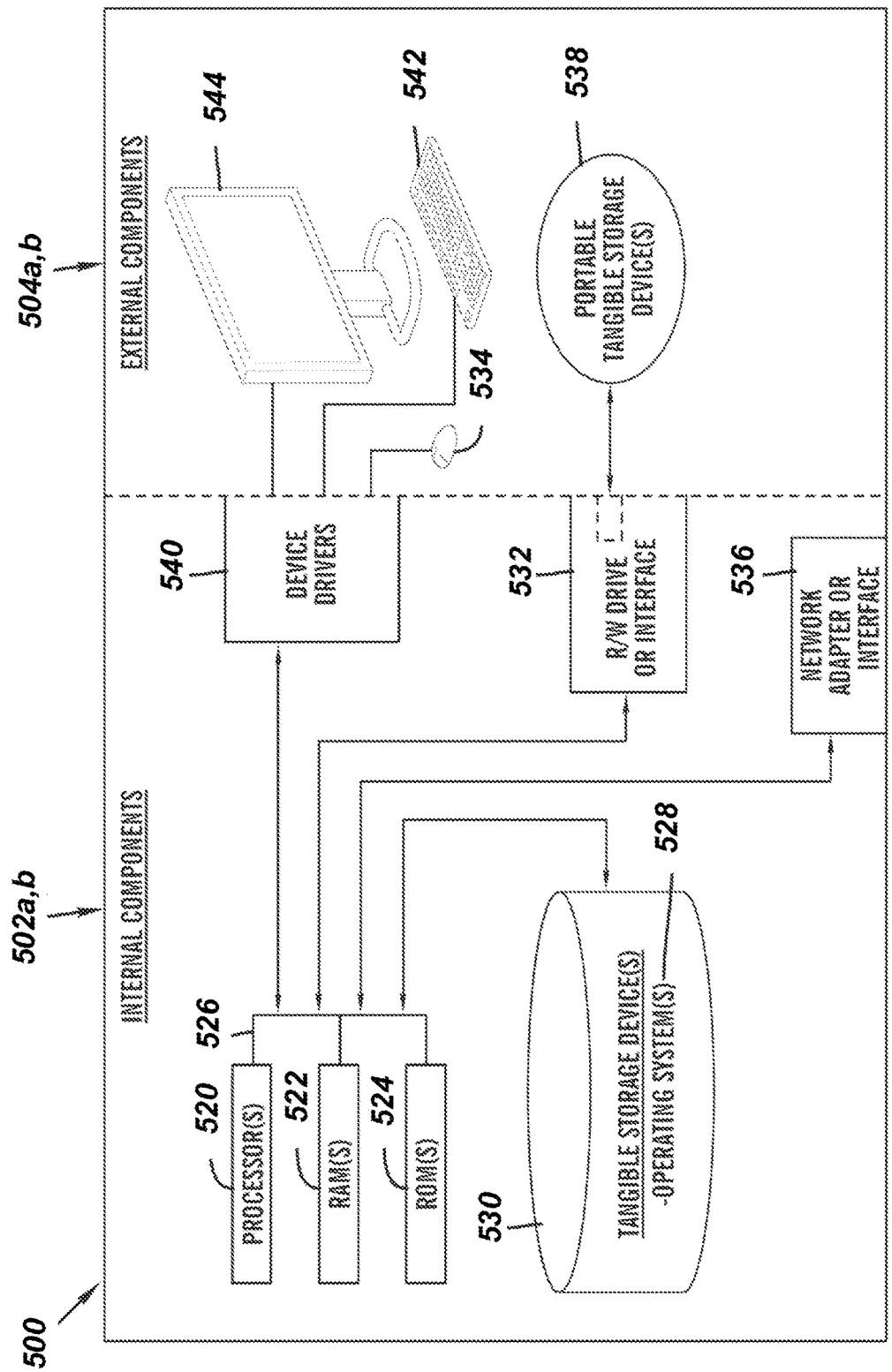
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the braille actuation program 110A in the client computing device 102 and the braille actuation program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the braille actuation program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the braille actuation program 110A in the client computing device 102 and the braille actuation program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the braille actuation program 110A in the client computing device 102 and the braille actuation program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
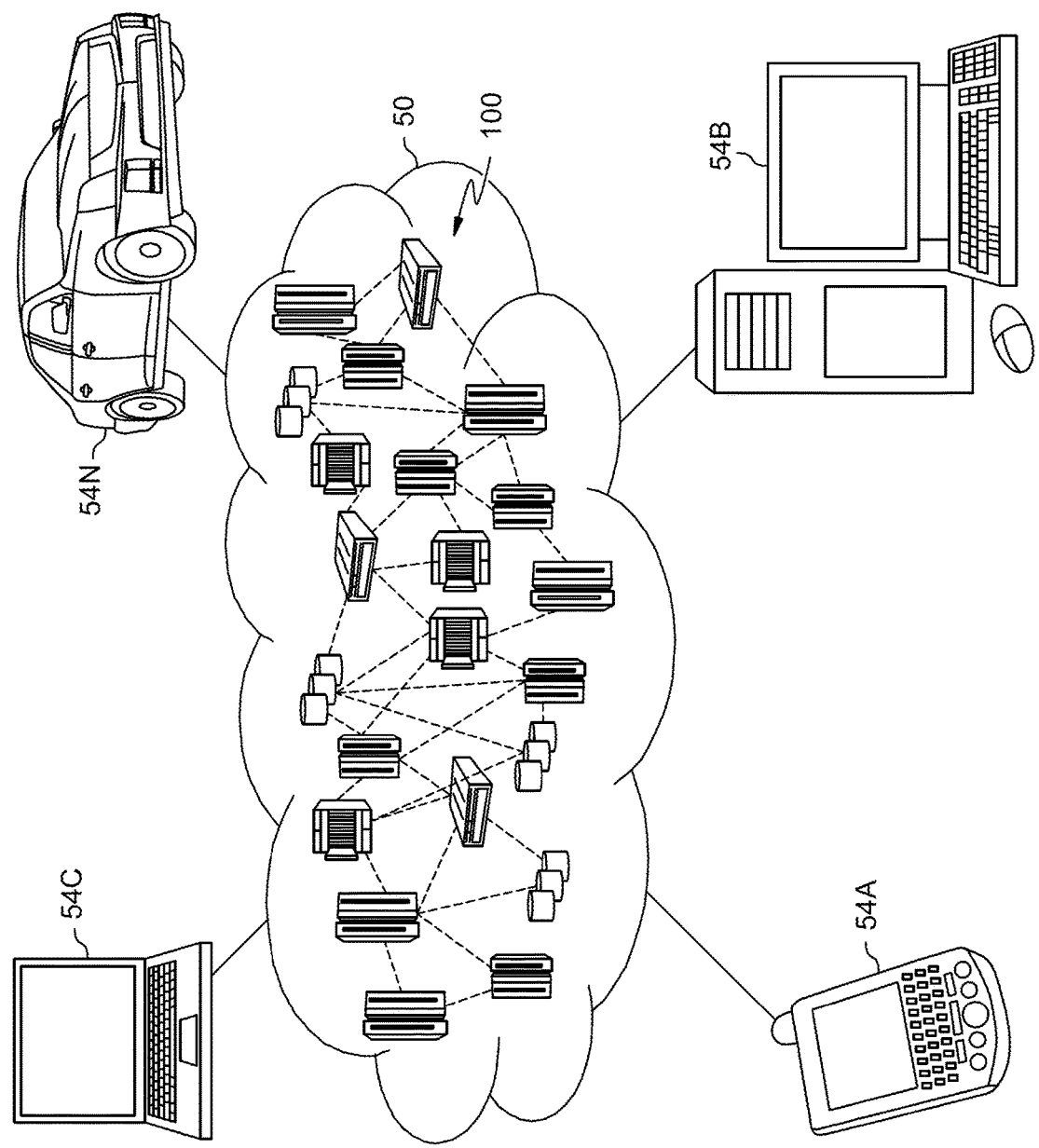
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
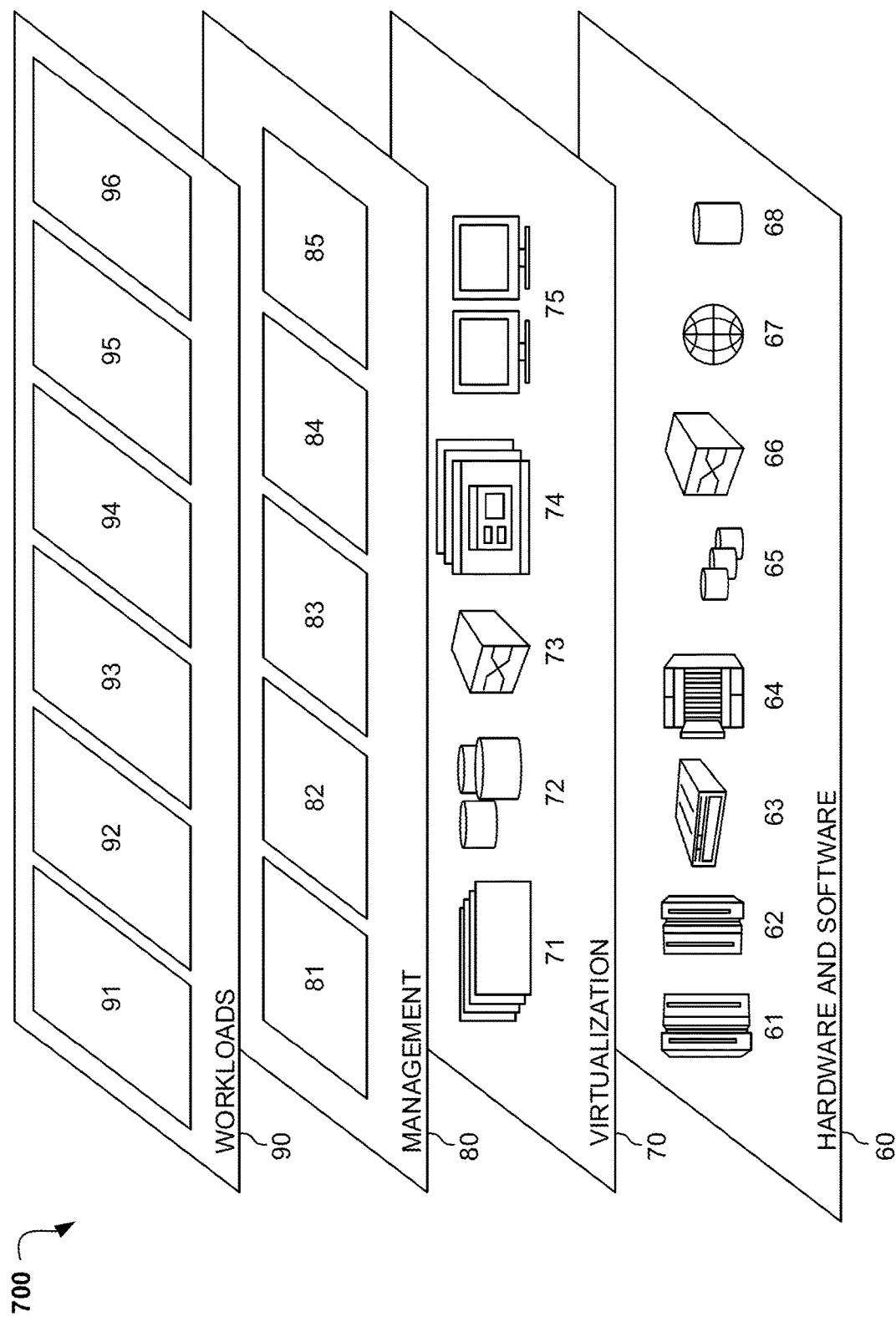
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and braille actuation 96. Braille actuation 96 may relate translating visual media received by a client device to an appropriate braille element and generating the translation as protrusions on a surface of a stretchable user device display screen using digital microfluidic actuators.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   receiving a plurality of media;
   translating one or more visual elements of the received plurality of media to braille; and
   generating a plurality of protrusions, each raised to a preconfigured height on a surface of a stretchable display screen by a plurality of embedded actuation electrodes, corresponding to the one or more translated visual elements using microfluidic actuation, wherein the plurality of protrusions are generated by a plurality of microfluidic droplets and color LED pixels raised by the plurality of embedded actuation electrodes, and wherein a subset of three or more actuation electrodes within the plurality of embedded actuation electrodes are aligned vertically, and wherein a single actuation electrode within the subset is closed while all other electrodes in the subset are open, and wherein each microfluidic droplet is set beneath a color LED pixel.

2. The method of claim 1, further comprising:
   identifying a user interaction with the plurality of protrusions through a touchscreen of the stretchable display; and
   performing a preconfigured action associated the user interaction.

3. The method of claim 2, wherein the user interaction is selected from a group consisting of multiple presses, touch-drag, deep touch, and long touch techniques.

4. The method of claim 2, wherein the user interaction is identified through a depression or an application of pressure to one or more protrusions within the plurality of generated protrusions.

5. The method of claim 1, wherein each microfluidic droplet and color LED pixel pair are aligned between a pair of hydrophobic layers, and wherein one hydrophobic layer is affixed to a ground layer and one hydrophobic layer is affixed to an insulating layer, and wherein the insulating layer has the plurality of embedded actuation electrodes, and wherein each actuation electrode is connected to a voltage source through a switch that is open or closed, and wherein the ground layer is connected to the voltage source, and wherein the pair of hydrophobic layers, the insulating layer, and the ground layer are perpendicular to the stretchable display screen.

6. The method of claim 5, wherein a height of each protrusion within the plurality of generated protrusions is determined by a closeness of each actuation electrode to the surface of the stretchable display screen.

7. The method of claim 1, wherein the one or more translated visual elements are selected from a group consisting of a plurality of text and a plurality of images.

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a plurality of media;
   translating one or more visual elements of the received plurality of media to braille; and
   generating a plurality of protrusions, each raised to a preconfigured height on a surface of a stretchable display screen by a plurality of embedded actuation electrodes, corresponding to the one or more translated visual elements using microfluidic actuation, wherein the plurality of protrusions are generated by a plurality of microfluidic droplets and color LED pixels raised by the plurality of embedded actuation electrodes, and wherein a subset of three or more actuation electrodes within the plurality of embedded actuation electrodes are aligned vertically, and wherein a single actuation electrode within the subset is closed while all other electrodes in the subset are open, and wherein each microfluidic droplet is set beneath a color LED pixel.

9. The computer system of claim 8, further comprising:
identifying a user interaction with the plurality of protrusions through a touchscreen of the stretchable display; and performing a preconfigured action associated the user interaction.

10. The computer system of claim 9, wherein the user interaction is selected from a group consisting of multiple presses, touch-drag, deep touch, and long touch techniques.

11. The computer system of claim 9, wherein the user interaction is identified through a depression or an application of pressure to one or more protrusions within the plurality of generated protrusions.

12. The computer system of claim 8, wherein each microfluidic droplet and color LED pixel pair are aligned between a pair of hydrophobic layers, and wherein one hydrophobic layer is affixed to a ground layer and one hydrophobic layer is affixed to an insulating layer, and wherein the insulating layer has the plurality of embedded actuation electrodes, and wherein each actuation electrode is connected to a voltage source through a switch that is open or closed, and wherein the ground layer is connected to the voltage source; and wherein the pair of hydrophobic layers, the insulating layer, and the ground layer are perpendicular to the stretchable display screen.

13. The computer system of claim 12, wherein a height of each protrusion within the plurality of generated protrusions is determined by a closeness of each actuation electrode to the surface of the stretchable display screen.

14. The computer system of claim 8, wherein the one or more translated visual elements are selected from a group consisting of a plurality of text and a plurality of images.

15. A computer program product, the computer program product comprising:
one or more computer-readable tangible storage medium and program instructions stored on at least one of the one or more tangible storage medium, the program instructions executable by a processor capable of performing a method, the method comprising:
receiving a plurality of media;
translating one or more visual elements of the received plurality of media to braille; and
generating a plurality of protrusions, each raised to a preconfigured height on a surface of a stretchable display screen by a plurality of embedded actuation electrodes, corresponding to the one or more translated visual elements using microfluidic actuation, wherein the plurality of protrusions are generated by a plurality of microfluidic droplets and color LED pixels raised by the plurality of embedded actuation electrodes, and wherein a subset of three or more actuation electrodes within the plurality of embedded actuation electrodes are aligned vertically, and wherein a single actuation electrode within the subset is closed while all other electrodes in the subset are open, and wherein each microfluidic droplet is set beneath a color LED pixel.

16. The computer program product of claim 15, further comprising:
identifying a user interaction with the plurality of protrusions through a touchscreen of the stretchable display; and performing a preconfigured action associated the user interaction.

17. The computer program product of claim 16, wherein the user interaction is selected from a group consisting of multiple presses, touch-drag, deep touch, and long touch techniques.

18. The computer program product of claim 16, wherein the user interaction is identified through a depression or an application of pressure to one or more protrusions within the plurality of generated protrusions.

19. The computer program product of claim 15, wherein each microfluidic droplet and color LED pixel pair are aligned between a pair of hydrophobic layers, and wherein one hydrophobic layer is affixed to a ground layer and one hydrophobic layer is affixed to an insulating layer, and wherein the insulating layer has the plurality of embedded actuation electrodes, and wherein each actuation electrode is connected to a voltage source through a switch that is open or closed, and wherein the ground layer is connected to the voltage source; and wherein the pair of hydrophobic layers, the insulating layer, and the ground layer are perpendicular to the stretchable display screen.

20. The computer program product of claim 19, wherein a height of each protrusion within the plurality of generated protrusions is determined by a closeness of each actuation electrode to the surface of the stretchable display screen.

* * * * *